US012627021B2

(12) United States Patent
Xu et al.

(10) Patent No.: US 12,627,021 B2
(45) Date of Patent: May 12, 2026

(54) BASE STATION ANTENNA

(71) Applicant: HUAWEI TECHNOLOGIES CO., LTD., Shenzhen (CN)

(72) Inventors: Chunliang Xu, Xi'an (CN); Jiejun Zhou, Xi'an (CN); Xinming Liu, Xi'an (CN); Wei Kang, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 377 days.

(21) Appl. No.: 18/344,476

(22) Filed: Jun. 29, 2023

(65) Prior Publication Data

US 2023/0344103 A1 Oct. 26, 2023

Related U.S. Application Data

(63) Continuation of application No. PCT/CN2020/141829, filed on Dec. 30, 2020.

(51) Int. Cl.

| | |
|---|---|
| ***H01Q 1/24*** | (2006.01) |
| ***H01P 3/08*** | (2006.01) |
| ***H01Q 1/50*** | (2006.01) |
| ***H01Q 3/36*** | (2006.01) |

(52) U.S. Cl.

CPC ................. *H01P 3/08* (2013.01); *H01Q 1/50* (2013.01); *H01Q 3/36* (2013.01); *H01Q 1/246* (2013.01)

(58) Field of Classification Search

CPC .. H01P 3/08; H01P 5/085; H01Q 1/50; H01Q 1/36; H01Q 1/246; H01Q 21/0075

See application file for complete search history.

(56) References Cited

U.S. PATENT DOCUMENTS

| | | | |
|---|---|---|---|
| 5,506,589 A | 4/1996 | Quan et al. | |
| 12,069,801 B2 * | 8/2024 | Liu ......................... | H01P 1/184 |
| 2016/0254595 A1 | 9/2016 | Sobczak et al. | |

FOREIGN PATENT DOCUMENTS

| | | |
|---|---|---|
| CN | 101015090 A | 8/2007 |
| CN | 101267061 A | 9/2008 |
| CN | 201181740 Y | 1/2009 |
| CN | 104466330 A | 3/2015 |
| CN | 111725592 A | 9/2020 |
| CN | 111883880 A | 11/2020 |
| GB | 2410838 A | 8/2005 |

OTHER PUBLICATIONS

International Search Report issued in corresponding International Application No. PCT/CN2020/141829, dated Sep. 29, 2021, pp. 1-8.

Extended European Search Report issued in corresponding European Application No. 20967646.9, dated Dec. 20, 2023, pp. 1-12.

Chinese First Office Action issued in corresponding Chinese Application No. 202080107246.2, dated Jan. 17, 2025, pp. 1-6.

* cited by examiner

*Primary Examiner* — Awat M Salih

(74) *Attorney, Agent, or Firm* — HAUPTMAN HAM, LLP

(57) ABSTRACT

A base station antenna includes a feed network, a cable and an adapter structure. The feed network includes a cavity, and an internal structure in the cavity. The adapter structure includes a first transmission line. A first end of the first transmission line is electrically connected to the internal structure. A second end of the first transmission is electrically connected to the cable. The first transmission line is configured to transmit a radio frequency signal. The first transmission line is at least partially located outside the cavity.

20 Claims, 6 Drawing Sheets

BASE STATION ANTENNA

CROSS-REFERENCE TO RELATED APPLICATIONS

This application is a continuation of International Application No. PCT/CN2020/141829, filed on Dec. 30, 2020, the disclosure of which is hereby incorporated by reference in its entirety.

TECHNICAL FIELD

This application relates to the field of antenna technologies, and in particular, to a base station antenna.

BACKGROUND

A base station antenna includes components such as a cable, a feed network, and a radiation unit. Each module is connected through media. As a mobile communication system develops towards a multi-frequency multi-system, the base station antenna also needs multi-frequency multi-polarization. However, a multi-frequency base station antenna has many frequency bands, resulting in a very complex connection of the feed network. Consequently, discontinuous transmission of a radio frequency signal is increased, and electrical performance of the base station antenna is affected.

SUMMARY

One or more embodiments of this application provide a base station antenna. A feed network in the base station antenna is connected to a cable by an adapter structure, and characteristic impedance of a transmission line of the adapter structure is adjusted to match impedance of the cable, to expand matching range of the feed network and improve continuity of radio frequency signal transmission, thereby improving electrical performance of the antenna base station.

In some embodiments, a base station antenna includes a feed network, a cable, and an adapter structure. The feed network includes a cavity and an internal structure located in the cavity. The adapter structure includes a first transmission line. One end of the first transmission line is electrically connected to the internal structure, and the other end of the first transmission line is electrically connected to the cable. The first transmission line is configured to transmit a radio frequency signal. The first transmission line is at least partially located outside the cavity.

In some embodiments, characteristic impedance of the first transmission line is easy to adjust, and an internal loss of the radio frequency signal in the first transmission line is less than the loss of the radio frequency signal in the cable. The feed network and the cable are transferred through the first transmission line, and characteristic impedance of the first transmission line is adjusted to match impedance of the cable, to expand matching range of the feed network. In some approaches, the cable is directly connected to the feed network. However, in this application, a part of the cable is replaced with first transmission line. Because a loss caused by the first transmission line to the radio frequency signal is lower than a loss caused by the cable of a same length, impedance of a transmission line of the radio frequency signal is reduced, a loss is reduced, and an antenna gain is improved.

In some embodiments, one end of the first transmission line extends into the cavity to connect to the internal structure, to expand matching range of the feed network and reduce assembly and design difficulties.

In some embodiments, the first transmission line is completely located outside the cavity. The adapter structure further includes a second transmission line. One end of the second transmission line is connected to the first transmission line, and the other end of the second transmission line extends into the cavity to connect to the internal structure.

In some embodiments, the second transmission line is used for transition, to enable the first transmission line to be more flexibly connected to the internal structure of the feed network. In addition, the characteristic impedances of the first transmission line and the second transmission line may be separately designed, to match impedance of the cable, thereby improving design flexibility and expanding matching range of the feed network.

In some embodiments, the first transmission line and the second transmission line use a same transmission line structure, to enable the second transmission line and the first transmission line to be connected in a simple manner, and reduce assembly difficulty. The transmission line structure is a suspended strip line, a microstrip, or a strip line.

In some embodiments, the first transmission line and the second transmission line use different transmission line structures, to enable different transmission modes to be implemented, thereby achieving an objective of switching a radio frequency transmission mode. The transmission line structure is a suspended strip line, a microstrip, or a strip line.

In some embodiments, the feed network includes a phase shifter and a power divider, and the power divider is electrically connected to the phase shifter. The power divider receives a radio frequency signal from the cable through a phase-shift network of the phase shifter, then divides the radio frequency signal into a plurality of channels of output signals based on an actual application requirement, and sends the output signals to the radiation unit through the plurality of output ports. The radiation unit converts an electrical signal into an electromagnetic wave, and finally the electromagnetic wave is received by a terminal such as a mobile phone.

In some embodiments, the first transmission line is the suspended strip line, and the suspended strip line includes a metal strip. For example, the suspended strip line may further include a metal cavity and a dielectric substrate. The dielectric substrate is suspended in the metal cavity. The metal strip is fixedly connected to the dielectric substrate. A resonance frequency and a high-order mode frequency of the suspended strip line may be increased by adjusting a structure of the metal strip and a width and length of the metal cavity, so that the resonance frequency and the high-order mode frequency are not fall within a working frequency. This may be applicable to an application scenario with a higher frequency.

In some embodiments, the metal cavity includes two metal side walls that are disposed opposite to each other, recesses are disposed on both the two metal side walls, openings of the recesses face an inner side of the metal cavity, and the dielectric substrate is embedded in the two recesses. In this way, the dielectric substrate is grounded through metal cavity walls on two sides. Therefore, a circuit design may be performed on two sides of the dielectric substrate.

In some embodiments, the suspended strip line includes two metal strips. The two metal strips are oppositely located on two sides of the dielectric substrate. Compared with a single-layer circuit, a double-sided circuit formed by metal strips on two sides has a strong coupling characteristic, and is more convenient to be connected to another type of transmission line, for example, a slot line or a coplanar waveguide.

In some embodiments, the first transmission line is the strip line, the strip line includes a dielectric and a conductor strip disposed in the middle of the dielectric. The dielectric is disposed between two conductive planes. The two conductive planes are both grounded. The characteristic impedance of the strip line may be controlled by adjusting a thickness and width of the conductor strip, a relative dielectric constant of the dielectric and a distance between two conductive planes. In addition, because the conductor strip of the strip line is embedded between the two conductive planes, impedance of the strip line is easy to control. In addition, when the radio frequency signal is transmitted in the strip line, an electric field of the radio frequency signal is distributed between the conductive planes, and does not radiate to the strip line, so that a shielding capability is good. Similarly, the radio frequency signal is also not interfered by external radiation, and an anti-interference capability is strong.

In some embodiments, the first transmission line is the microstrip. The microstrip includes a dielectric substrate and a metal strip. The metal strip is fixedly connected to the dielectric substrate. The characteristic impedance of the microstrip can be controlled by adjusting a thickness and width of the conductor strip and the thickness of the dielectric substrate. In addition, because on one side of the conductor strip of the microstrip is a dielectric (a dielectric substrate), on the other side of the conductor strip of the microstrip is air, and a relative dielectric constant of the dielectric may be greater than the relative dielectric constant of the air, a transmission speed of the radio frequency signal in the microstrip is high, which facilitates transmission of a signal that requires a high speed.

DETAILED DESCRIPTION

The following describes one or more embodiments of this application with reference to the accompanying drawings in embodiments of this application. In the descriptions of embodiments of this application, "a plurality of" means two or more than two unless otherwise specified.

Figure 1:
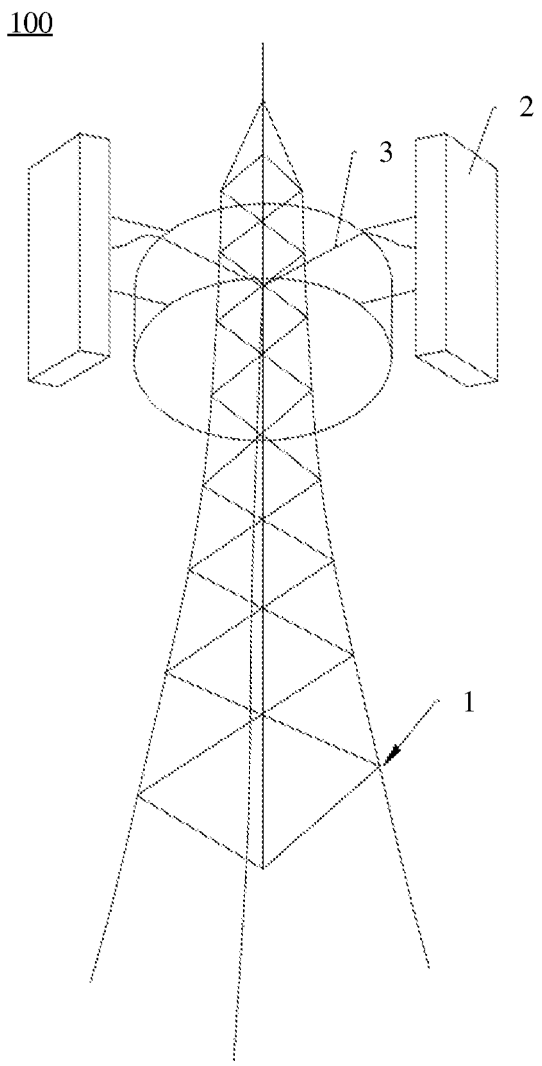
FIG. 1 is a schematic diagram of a structure of a base station in some embodiments according to this application.

FIG. 1 is a schematic diagram of a structure of a base station 100 in some embodiments according to this application. The base station 100 may also be referred to as a public mobile communication base station, and is a radio transceiver station that performs information transmission with a terminal such as a mobile phone in a specific radio coverage area through a mobile communication switching center. As shown in FIG. 1, the base station 100 may include a tower 1, a base station antenna 2, and a feeder 3. A bottom of the tower 1 is fixed on the ground, and the bottom is large and a top is small, to provide stable support. It may be understood that orientation terms such as "top", "bottom", "up", and "down" in this application are described with reference to orientations in the accompanying drawings, and do not indicate or imply that an apparatus or an element to be referred to must have a particular orientation, and be constructed and operated in a particular orientation. Therefore, this cannot be understood as a limitation on this application.

The base station antenna 2 is installed on the top of the tower 1. The base station antenna 2 is configured to transmit and receive a radio frequency signal. The feeder 3 extends from the bottom of the tower 1 to the top of the tower 1 and is electrically connected to the base station antenna 2. An electrical connection includes two connection manners: a coupling connection and a connection through a conductor. The feeder 3 is configured to transmit the radio frequency signal, and may not only transmit the radio frequency signal transmitted by a transmitter to an input end of the base station antenna 2, and radiate the radio frequency signal, through the base station antenna 2, to be received by a terminal device such as a mobile phone, but also transmit the radio frequency signal received by the base station antenna 2 to an input end of a receiver.

The transmitter is configured to modulate a wanted low frequency signal, convert the low frequency signal into a radio frequency signal that has a certain bandwidth on a central frequency and is suitable for transmission through an antenna, and transmit the radio frequency signal to the input end of the base station antenna 2. The receiver can receive the radio frequency signal from the base station antenna 2, select a required frequency component from a plurality of radio frequency signals, and suppress or filter out an unnecessary signal or noise and interference signal to obtain useful information.

Figure 2:
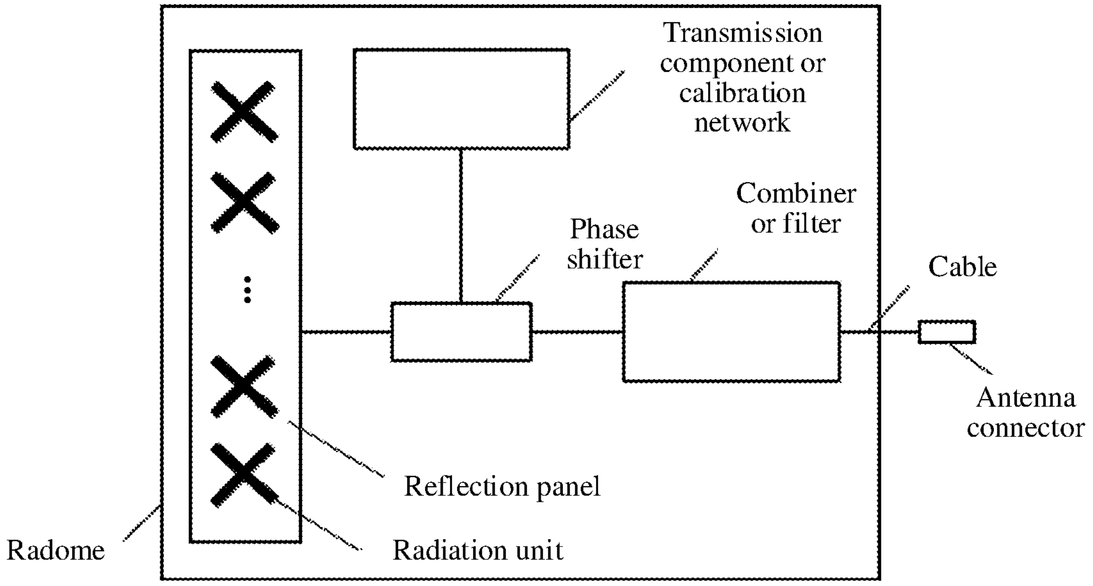
FIG. 2 is a schematic diagram of an internal structure of a base station antenna in some embodiments according to this application.

In some embodiments, FIG. 2 is a schematic diagram of an internal structure of a base station antenna 2 in some embodiments according to this application. The base station antenna 2 is configured to convert a guided electromagnetic wave fed by the transmitter into a space electromagnetic wave, or convert an electromagnetic wave into a guided electromagnetic wave and transmit the guided electromagnetic wave to the receiver. An electromagnetic wave propagated along a specific path (for example, a cable or a transmission line) is a guided electromagnetic wave. A modulated electromagnetic wave with a certain transmitting frequency is a radio frequency signal.

The base station antenna 2 may include a radome, a radiation unit, a feed network, and an antenna connector. The radome may be a housing, and a cavity may be disposed inside the radome. The cavity is configured to accommodate the radiation unit and the feed network. The radiation unit may also be referred to as an oscillator or an antenna oscillator, and can effectively radiate or receive a radio frequency signal. The radiation unit is electrically connected to the feed network, and receives or transmits a radio frequency signal through the feed network. The antenna connector is located outside the radome, and is electrically connected to the feed network located in the radome cavity through the cable. Referring to FIG. 1 and FIG. 2 together, the other end of the antenna connector may be electrically connected to the feeder 3. The feed network receives the radio frequency signal from the feeder 3 through the antenna connector, and transmits the radio frequency signal to the radiation unit. The radio frequency signal is radiated through the radiation unit, and is received by a terminal device such as a mobile phone. In addition, the base station antenna 2 may also receive the radio frequency signal, and transmit the received radio frequency signal to an input end of the receiver through the feeder 3, to implement signal transmission.

For example, the radiation unit may be a half-wave oscillator, a full-wave oscillator, or the like. This is not limited in this embodiment of this application. In some embodiments, as shown in FIG. 2, the base station antenna 2 may further include a reflection panel. The radiation unit may be fixedly connected to the reflection panel. The reflection panel may also be referred to as a bottom plate, an antenna panel, or a metal reflection surface. The reflection panel is configured to improve sensitivity of the radiation unit to receive antenna signals, and reflect and aggregate the antenna signals on a signal receiving point. The reflection panel may be made of a metal material. A capability of the radiation unit not only can be greatly enhanced to receive or radiate a signal, but interference caused by another electromagnetic wave from a side of the reflection panel away from the radiation unit can also be blocked and shielded.

For example, the base station antenna 2 may include a plurality of radiation elements. The plurality of radiation elements may form a radiation array and are fixedly connected to the reflection panel. In some other embodiments, a plurality of radiation elements may also form a plurality of radiation arrays, and are respectively fixedly connected to a plurality of reflection panels, to implement multi-frequency multi-polarization of the antenna. This is not limited in this embodiment of this application.

In some embodiments, the base station antenna 2 may include one radiation unit array. In some other embodiments, the base station antenna 2 may alternatively include a plurality of radiation unit arrays. The base station antenna 2 may further include a plurality of feed networks. Each radiation unit array may be corresponding to a different feed network. A plurality of radiation unit arrays may receive or transmit radio frequency signals through each feed network, to implement multi-frequency multi-polarization of the base station antenna 2.

For example, the radome is configured to protect a system of the base station antenna 2 from being affected by an external environment. In some embodiments, the radome may be made of a non-metal material, to enable the radome to have a good electromagnetic wave penetration characteristic in electrical performance, thereby avoiding a loss caused to the radio frequency signal and improving an antenna gain. In addition, the radome can resist an external harsh environment in mechanical performance. The system of the base station antenna 2 inside the radome can be prevented from being affected by the external environment, thereby increasing a life span of the base station antenna 2.

In some embodiments, the feed network may include a controlled impedance transmission line. The feed network is configured to implement energy transmission from the antenna connector to the radiation unit, and is further configured to implement amplitude and phase distribution of the radio frequency signal between radiation units, and implement impedance matching with the cable. In this application, that load impedance connected to a cable end terminal is equal to the characteristic impedance of the cable indicates "matching impedance of the cable". For example, the feed network may include a phase shifter. In some embodiments, the feed network may further include components such as a power divider, a combiner, and a filter.

In some embodiments, a phase shifter (Phaser) may be configured to adjust a phase of a radio frequency signal, and implement phase adjustment by digital phase shift and/or resistor-capacitor phase shift. For example, the digital phase shift may be implemented by A/D and D/A conversion. The resistor-capacitor phase shift may be implemented by changing a power supply frequency and a circuit parameter.

In some embodiments, the power divider may be configured to allocate energy of an input signal, and adjust signal energy in different output directions based on a requirement, to improve energy utilization. The power divider may implement energy distribution by dividing input signals into two or more channels. For example, energy carried in each channel of signals may be equal, or energy carried in at least two channels of signals may be unequal. This is not limited in this embodiment of this application.

In some embodiments, the combiner is configured to combine multi-frequency signals together, and output the multi-frequency signals through one transmission line, to simplify a feed network structure, and further avoid a process of switching radiation units of different frequency bands. For example, the combiner may be used in an antenna transmit end to combine two or more channels of radio frequency signals transmitted by different transmitters into one channel and send the one channel to the radiation unit, and avoid mutual impact between each signal of ports. In some other embodiments, the combiner may alternatively be used in an antenna receive end to combine the radio frequency signals received by the antenna into one channel, and send the one channel to the receiver for subsequent processing. This is not limited in this embodiment of this application.

In some embodiments, the filter is configured to filter out a radio frequency signal of a required frequency, to filter out interference noise or perform spectrum analysis. For example, the filter may be a frequency selection circuit including a capacitor, an inductor, and a resistor, to enable a signal having a specific frequency in a radio frequency signal to pass through, thereby greatly attenuating a signal having another frequency. The filter may effectively filter out a specific frequency to obtain a radio frequency signal after the specific frequency is eliminated, and may also effectively filter out a frequency other than the specific frequency to obtain a radio frequency signal having the specific frequency. This is not limited in this embodiment of this application.

For example, referring to FIG. 2, the feed network may further include a transmission component or a calibration network that is electrically connected to the phase shifter. The feed network may implement different radiation beam directions through the transmission component, and adjust the phase shifter by driving the transmission component through a motor, to achieve adjustment of downtilt of an antenna pattern in vertical. In addition, the feed network may be connected to the calibration network to obtain a required calibration signal. The calibration network extracts a part of a radio frequency signal that inputs to each radiation port, and monitors the extracted signal, to ensure that beamforming by baseband signal processing enables accurate distribution to an antenna radiator and makes amplitude and phase of signals inputted to each radiation port stable.

In this application, as shown in FIG. 2, after the radio frequency signal enters the feed network, the combiner or the filter first combines or selects a frequency for the signal, and transmits the signal to the phase shifter. Then, a phase of the signal is adjusted through a phase-shift network, and the signal may be further processed through the transmission component or the calibration network, to form a radio frequency signal to be transmitted to the outside. Finally, the radio frequency signal processed by the feed network is transmitted to the radiation unit, and is radiated by the radiation unit, and is received by a terminal device such as a mobile phone.

For example, the feed network may be electrically connected to the antenna connector through the cable. In this way, a purpose of transmitting the radio frequency signal that is from the feeder 3 to the feed network is achieved.

Figure 3:
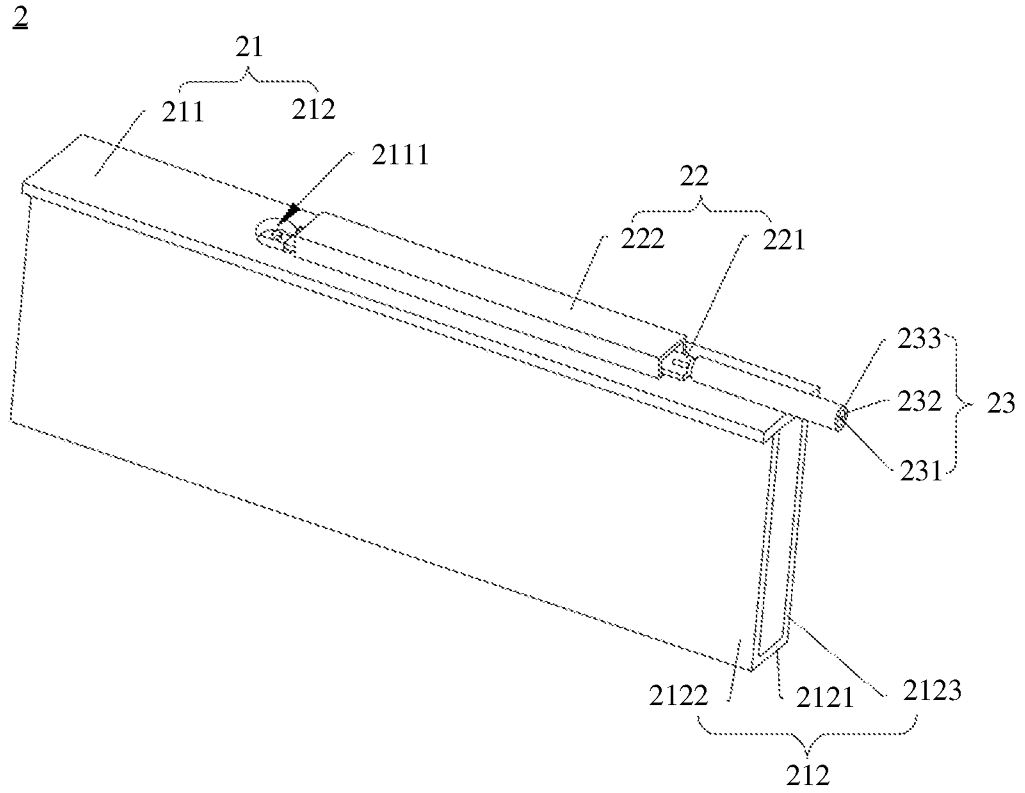
FIG. 3 is a schematic diagram of a partial structure of the base station antenna shown in FIG. 2 in some embodiments.

In this embodiment of this application, FIG. 3 is a schematic diagram of a partial structure of the base station antenna 2 shown in FIG. 2 in some embodiments.

A feed network 21 may be electrically connected to the cable 23 through an adapter structure 22. The feed network 21 includes an end cover 211 and a cavity 212 fixedly connected to the end cover 211. The cavity 212 includes a bottom plate 2121 disposed opposite to the end cover 211 and two side plates 2122 and 2123 located on two sides of the bottom plate 2121. The two side plates 2122 and 2123 are disposed opposite to each other and fixedly connected to the bottom plate 2121. The two side plates 2122 and 2123 may be connected to an inner side of an edge of the end cover 211, and are fixedly connected to the end cover 211. The feed network 21 further includes an internal structure (not shown in the figure). The cavity 212 is configured to accommodate the internal structure of the feed network 21.

The adapter structure 22 may include a first transmission line 221. The first transmission line 221 is configured to transmit a radio frequency signal. One end of the first transmission line 221 is electrically connected to the internal structure of the feed network 21, and the other end of the first transmission line 221 is electrically connected to the cable 23. The first transmission line 221 is located on a side that is of the end cover 211 and that is opposite to the cavity 212. For example, the first transmission line 221 may be completely located outside the cavity 212. In some other embodiments, the first transmission line 221 may alternatively be partially located outside the cavity 212, provided that it is ensured that the first transmission line 221 is at least partially located outside the cavity 212. This is not limited in this embodiment of this application. The first transmission line 221 may be a structure such as a microstrip, a strip line, or a suspended strip line.

In this embodiment, characteristic impedance of the first transmission line 221 is easy to adjust, and an internal loss of the radio frequency signal in the first transmission line is less than the loss of the radio frequency signal in the cable 23. In this application, the feed network 21 and the cable 23 are transferred through the first transmission line 221, and characteristic impedance of the first transmission line 221 is adjusted to match impedance of the cable 23, to expand matching range of the feed network 21. In some approaches, the cable 23 is directly connected to the feed network 21. However, in this application, a part of the cable 23 is replaced with the first transmission line 221. Because a loss caused by the first transmission line 221 to the radio frequency signal is lower than a loss caused by the cable 23 of a same length, impedance of a transmission line of the radio frequency signal is reduced, a loss is reduced, and an antenna gain is improved.

For example, the adapter structure 22 further includes a housing 222. The housing 222 covers the first transmission line 221. The housing 222 includes a top plate that is opposite to an end cover and side plates that are located on two sides of the top plate. The two side plates are disposed oppositely in which one end is fixedly connected to the top plate and the other end is fixedly connected to the end cover. The top plate and the two side plates jointly enclose an inner cavity of a housing. The first transmission line 221 is at least partially located in the inner cavity of the housing. The housing is configured to protect the first transmission line 221 from being affected by an external environment. The housing may be made of a metal material, to shield electromagnetic radiation of the transmission line and reduce impact of an external electromagnetic environment on a transmitted radio frequency signal.

For example, the cable 23 is configured to transmit and distribute the radio frequency signal. The cable 23 has a multi-layer structure, for example, three layers. For example, the cable 23 includes a cable core 231, an insulation layer 232 wrapping outside the cable core 231, and a protective layer 233 wrapping outside the insulation layer 232. The cable core 231 is a conductive part of an electrical power cable, and is configured to transmit electric energy. The insulation layer 232 electrically isolates the cable core 231 from the ground to ensure electric energy transmission. In some embodiments, the cable may include a plurality of the cable cores 231, for example, two or three. In this case, the insulation layer 232 may electrically isolate the cable core 231 from the ground and different cable core 231. A function of the protective layer 233 is to protect the cable 23 from external impurities and moisture, and prevent the cable 23 from being directly damaged by an external force.

For example, the end cover 211 may be provided with a through hole 2111. An internal structure of the feed network 21 may be connected to the first transmission line 221 through the through hole 2111. For example, the first transmission line 221 may extend into the cavity through the through hole 2111, or the first transmission line 221 may be connected to the internal structure by extending into a middle connection structure (not shown in the figure) of the cavity 212, provided that at least a part of the first transmission line 221 is located outside the cavity 212. In some embodiments, the cavity 212 may be a semi-open structure. In some other embodiments, the cavity 212 may alternatively be a closed structure, to better avoid interference from external radiation, without affecting the radiation unit at a same time. This is not limited in this embodiment of this application.

Figure 4:
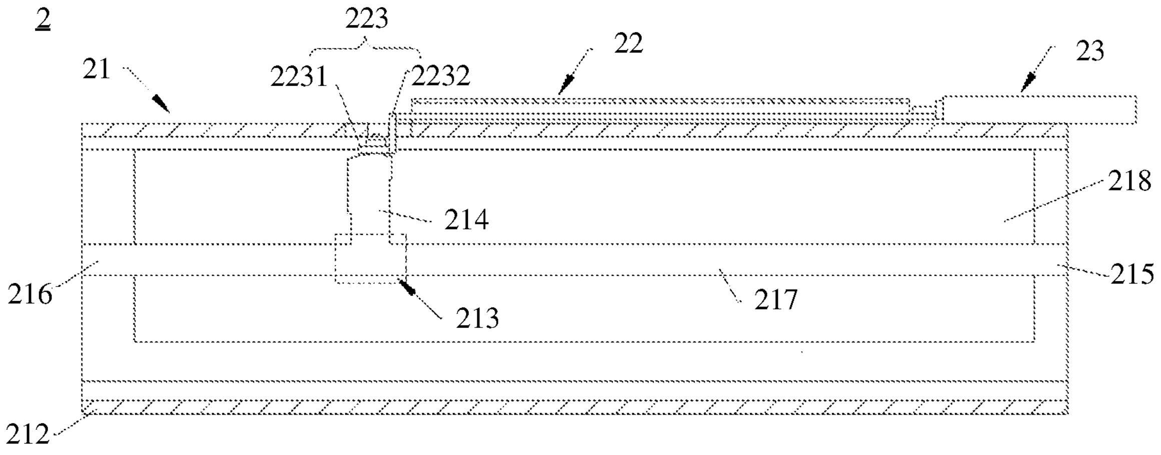
FIG. 4 is a schematic diagram of an internal structure of the base station antenna shown in FIG. 3.

FIG. 4 is a schematic diagram of an internal structure of the base station antenna 2 shown in FIG. 3. For example, an internal structure of the feed network includes a power divider 213, a phase-shift network 214, and a plurality of output ports 215 and 216. The adapter structure 22 is electrically connected to one end of the phase-shift network 214 and transmits the radio frequency signal. The power divider 213 may be electrically connected to the other end of the phase-shift network 214, or may be electrically connected to the plurality of output ports 215 and 216. For example, the output port 215 and 216 may be electrically connected to the radiation unit. The power divider 213 is configured to divide one channel of input signals into two or more channels of output signals. Energy of a plurality of channels of output signals may be equal to each other, or may be unequal to at least two channels of output signals. This is not limited in this embodiment of this application. Specifically, the power divider 213 receives a radio frequency signal from the cable 23 through the phase-shift network 214 of the phase shifter, then divides the radio frequency signal into the plurality of channels of output signals based on an actual application requirement, and sends the output signals to the radiation unit through the plurality of the output ports 215 and 216. The radiation unit converts an electrical signal into an electromagnetic wave, and finally the electromagnetic wave is received by a terminal such as a mobile phone.

For example, referring to FIG. 3 and FIG. 4 together, the adapter structure 22 includes a second transmission line 223 extending into the cavity. The first transmission line 221 may be connected to an internal structure through the second transmission line 223. For example, the second transmission line 223 includes a first segment 2231 and a second segment 2232. One end of the second segment 2232 is connected to one end of the first segment 2231, and the second segment 2232 is bent relative to the first segment 2231. For example, the second transmission line 223 may be L-shaped. The first segment 2231 may be fixedly connected to the phase-shift network 214. The second segment 2232 is fixedly connected to the first transmission line 221. For example, the first segment 2231 may be fixedly connected to the phase-shift network 214 by a fastener, welding, or the like. The second segment 2232 may be fixedly connected to the first transmission line 221 by welding, coupling, or the like. This is not limited in this embodiment of this application. Transition is performed through the second transmission line 223, so that the first transmission line 221 can be more flexibly connected to the internal structure of the feed network 21. In addition, characteristic impedances of the first transmission line 221 and the second transmission line 223 may also be separately designed, to match impedance of the cable 23, thereby improving design flexibility and expanding matching range of the feed network 21.

In some embodiments, the second transmission line 223 and the first transmission line 221 may have a same transmission line structure. In this way, the second transmission line 223 and the first transmission line 221 are connected in a simple manner, and assembly difficulty is reduced. In some other embodiments, the second transmission line 223 and the first transmission line 221 may have different transmission line structures, so that different transmission modes can be implemented, thereby achieving an objective of switching a radio frequency transmission mode. For example, the transmission line structure may include a strip line, a microstrip, or a suspended strip line. In some other embodiments, the transmission line may alternatively be another component having a radio frequency transmission function. This is not limited in this embodiment of this application.

For example, the plurality of output ports may include a first output port 215 and a second output port 216. In some embodiments, the power divider 213 may be directly electrically connected to the first output port 215, and is connected to the second output port 216 through a wiring 217. The wiring 217 may be a suspended strip line structure. The suspended strip line has good electromagnetic shielding performance, and does not cause electromagnetic interference to another component in the cavity 212. In addition, electromagnetic interference caused by another component is very small, helping ensure stability and continuity of radio frequency signal transmission. In some other embodiments, the wiring 217 may alternatively be another component having a radio frequency transmission function, for example, a microstrip and a strip line. This is not limited in this embodiment of this application.

For example, mode switching may exist between the adapter structure 22 and the feed network 21. For example, switching may be performed between all radio frequency transmission modes such as TEM (Transverse Electromagnetic Wave, transverse electric wave), TE (Transverse electric wave, transverse electric wave), and quasi-TEM. Specifically, because a propagation direction is not limited when the electromagnetic wave is propagated in free space, the electromagnetic wave is TEM; while the electromagnetic wave is one-dimensionally limited when the electromagnetic wave is propagated in the transmission line, and in this case, mode distribution is generated in a restricted direction. A propagation mode of the electromagnetic wave is a determined electromagnetic field distribution rule that may exist independently. The propagation mode of the electromagnetic wave is related to a shape and size of a cross section of the transmission line. For example, a rectangular transmission line usually transmits only an electromagnetic wave in a TE10 mode, and a coaxial line and a strip line transmit only an electromagnetic wave in a TEM mode. In addition, single-mode transmission and multi-mode transmission of the transmission line can also be controlled by adjusting the size of the transmission line. For an electromagnetic wave with a determined frequency, the size the transmission line is properly selected to cut off a higher-order mode and transmit only a main mode, that is, single-mode transmission. Allowing simultaneous transmission of the main mode and one or more higher-order modes is the multi-mode transmission.

For example, the feed network 21 further includes a medium 218. The medium 218 determines an equivalent dielectric constant in a transmission path of the radio frequency signal. The transmission path refers to a transmission section between a signal input end and a signal output end. By adjusting the equivalent dielectric constant of the medium 218 in the transmission path, power and a phase of a signal output from the signal output end can be controlled. For the transmission line without a metal cavity, for example, a strip line and a microstrip, the medium 218 in the cavity includes a substrate that is stacked on the medium 218 of the transmission line and air that is located around the transmission line.

Figure 5:
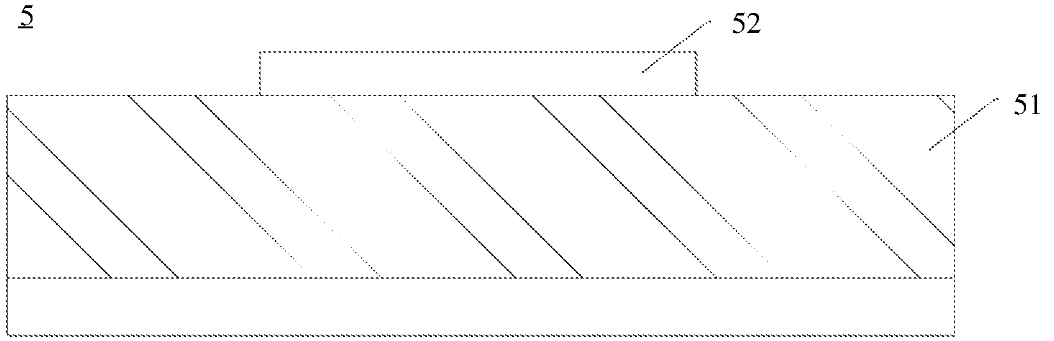
FIG. 5 is a schematic diagram of an internal structure of a microstrip in some embodiments according to this application.

For example, the transmission line structure may be a microstrip. FIG. 5 is a schematic diagram of an internal structure of a microstrip 5 in some embodiments according to this application. The microstrip 5 is a radio frequency transmission line formed by a dielectric substrate 51 and a conductor strip 52 fixedly connected to the dielectric substrate 51. A side of the dielectric substrate 51 that is opposite to the conductor strip 52 is grounded. Characteristic impedance of the microstrip 5 can be controlled by adjusting a thickness and width of the conductor strip 52 and the thickness of the dielectric substrate 51.

In addition, because on one side of the conductor strip 52 of the microstrip 5 is a dielectric (the dielectric substrate 51), on the other side of the microstrip 5 is air, and a relative dielectric constant of the dielectric may be greater than the relative dielectric constant of the air, a transmission speed of the radio frequency signal in the microstrip 5 is high, which facilitates transmission of a signal that requires a high speed. However, because a part of an electric field formed in the microstrip 5 is distributed in the dielectric substrate 51, and the other part is distributed in the air, the electric field is easily interfered by surrounding radiation. Therefore, an anti-interference capability of the microstrip 5 is poor.

Second, the conductor strip 52 of the microstrip 5 may have an increased width, to reduce a loss of a transmitted signal and improve an antenna gain.

Figure 6:
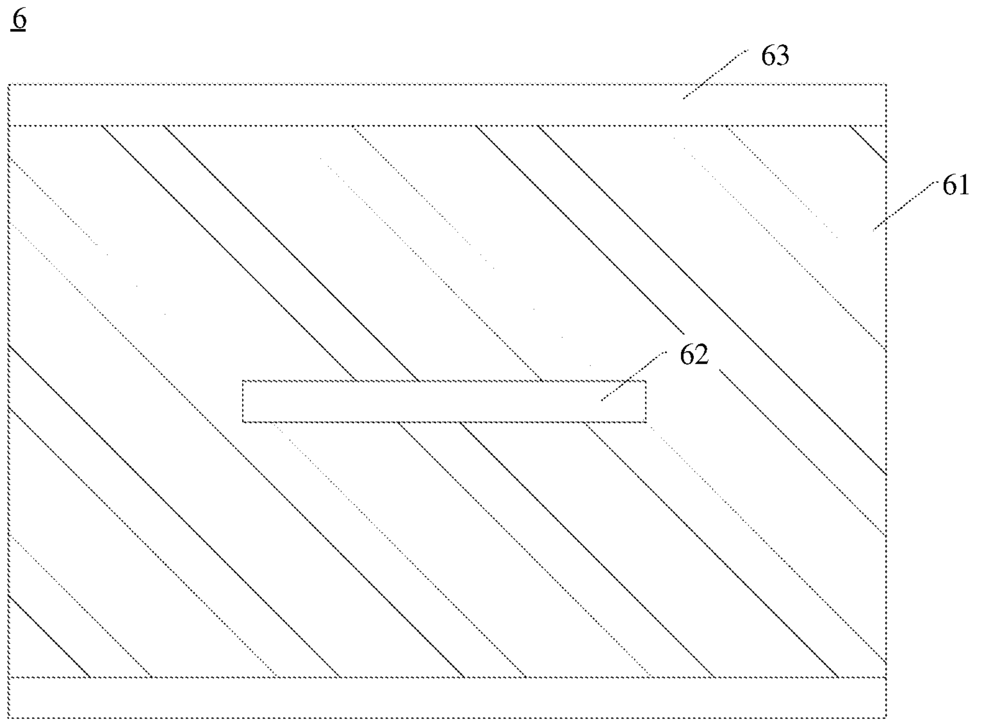
FIG. 6 is a schematic diagram of an internal structure of a strip line in some embodiments according to this application.

For example, the transmission line structure may be a strip line. FIG. 6 is a schematic diagram of an internal structure of a strip line 6 in some embodiments according to this application. The strip line 6 includes a dielectric 61 and a conductor strip 62 disposed in the middle of the dielectric 61. The dielectric 61 is disposed between two conductive planes 63, and two conductive planes 63 are both grounded. Characteristic impedance of the strip line 6 may be controlled by adjusting a thickness and width of the conductor strip 62, the relative dielectric constant of the dielectric 61, and a distance between the two conductive planes 63.

In addition, because the conductor strip 62 of the strip line 6 is embedded between the two conductive planes 63, impedance of the strip line 6 is easy to control. In addition, when a radio frequency signal is transmitted in the strip line 6, an electric field of the radio frequency signal is distributed between the conductive planes 63, and does not radiate to the strip line 6, so that a shielding capability is good. Similarly, the radio frequency signal is also not interfered by external radiation, and an anti-interference capability is strong. However, because the conductor strip 62 is surrounded by the dielectric 61, and the dielectric constant of the dielectric 61 may be greater than the relative dielectric constant of the air, a transmission speed of a signal in the strip line 6 is slower than that in the microstrip, affecting transmission efficiency of the radio frequency signal.

Figure 7:
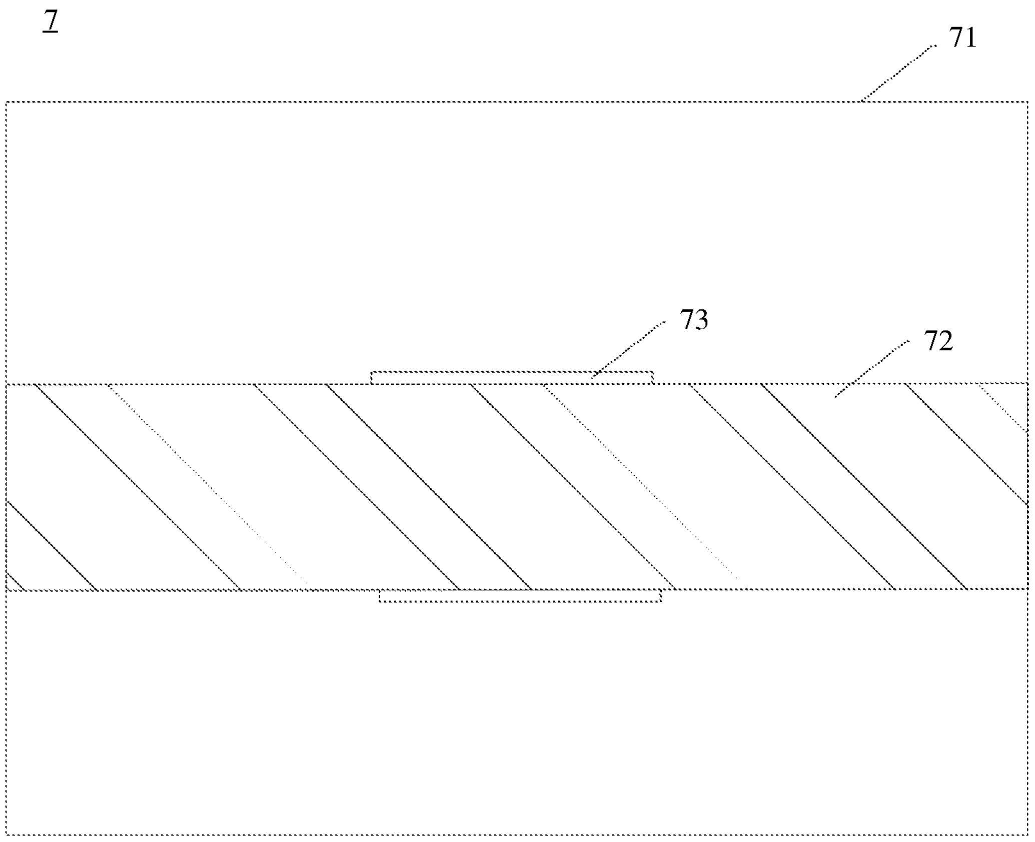
FIG. 7 is a schematic diagram of an internal structure of a suspended strip line in some embodiments according to this application.

For example, the transmission line structure may be a suspended strip line. FIG. 7 is a schematic diagram of an internal structure of a suspended strip line 7 in some embodiments according to this application. The suspended strip line 7 is a special strip line structure, and is characterized by low temperature drift and high-power capacity. The suspended strip line 7 includes a metal cavity 71, a dielectric substrate 72, and a metal strip 73. The dielectric substrate 72 is suspended in the metal cavity 71. The metal strip 73 is fixedly connected to the dielectric substrate 72. The suspended strip line 7 may include two metal strips 73. The two metal strips 73 are oppositely located on two sides of the dielectric substrate 72, and may also include one metal strip 73.

For example, recesses are disposed opposite to each other on metal cavity walls on two sides of the metal cavity 71. The dielectric substrate 72 is embedded in two recesses to be suspended in the metal cavity 71. The dielectric substrate 72 is grounded through metal cavity walls on two sides. Therefore, a circuit design may be performed on two sides of the dielectric substrate 72. In addition, the metal strip 73 may be used for the circuit design. Compared with a single-layer circuit, a double-sided circuit that can be formed by the metal strips 73 on the two sides of the dielectric substrate 72 has a strong coupling characteristic, and is more convenient to be connected to another type of a transmission line, for example, a recess line and a coplanar waveguide. Each of the dielectric substrate 72 has a cavity. The cavity is filled with air to form an air cavity.

Compared with the microstrip, most of internal electromagnetic fields of the suspended strip line 7 are distributed in the air cavity on upper and lower sides, and are less distributed in the dielectric substrate 72. Therefore, a relative dielectric constant of the suspended strip line 7 is close to the relative dielectric constant of the air, thereby effectively reducing an internal loss.

In addition, the air cavity generates an enclosure effect, and the metal cavity 71 on an outer side of the dielectric substrate 72 shields electromagnetic radiation, so that the transmission line has good electromagnetic shielding performance, can withstand high power, and can be used in a high-power component and system. Correspondingly, the metal strip 73 inside the metal cavity 71 is also very little affected by electromagnetic interference outside the metal cavity 71, to ensure accuracy of the radio frequency signal in a transmission process.

For example, a resonance frequency and a high-order mode frequency of the suspended strip line 7 may be increased by adjusting a structure of the metal strip 73 and a width and length of the metal cavity 71, so that the resonance frequency and the high-order mode frequency are not fall within a working frequency. This may be applicable to an application scenario with a higher frequency.

For example, referring to FIG. 3, when the first transmission line 221 is the suspended strip line 7, to be specific, when the suspended strip line 7 is at least partially located outside the cavity 212, the suspended strip line 7 may include a dielectric substrate, or may not include a dielectric substrate. This is not limited in this embodiment of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. When no conflict occurs, embodiments of this application and features in the embodiments may be mutually combined. Therefore, the protection scope of this application shall be subject to the protection scope of the claims.

What is claimed is:

1. A base station antenna, comprising a feed network, a cable, and an adapter structure, wherein the feed network comprises a cavity and an internal structure located in the cavity, the adapter structure comprises a first transmission line and a second transmission line, one end of the first transmission line is electrically connected to one end of the second transmission line, the other end of the first transmission is electrically connected to the cable;

wherein the first transmission line is completely located outside the cavity, one end of the second transmission line is connected to the first transmission line, and the other end of the second transmission line extends into the cavity and is connected to the internal structure, the first transmission line and the second transmission line are configured to transmit a radio frequency signal;

a transmission line structure of the first transmission line is a suspended strip line, a microstrip, or a strip line;

a transmission line structure of the second transmission line is a suspended strip line, a microstrip, or a strip line;

the adapter structure further comprises a housing, the housing covers the first transmission line.

2. The base station antenna according to claim 1, wherein the first transmission line and the second transmission line use a same transmission line structure.

3. The base station antenna according to claim 1, wherein the first transmission line and the second transmission line use different transmission line structures.

4. The base station antenna according to claim 1, wherein the feed network comprises a phase shifter and a power divider, and the power divider is electrically connected to the phase shifter.

5. The base station antenna according to claim 1, wherein and the suspended strip line comprises a metal strip.

6. The base station antenna according to claim 5, wherein the suspended strip line further comprises a metal cavity and a dielectric substrate, the dielectric substrate is suspended in the metal cavity, the metal strip is fixedly connected to the dielectric substrate, the metal cavity comprises two metal side walls that are disposed opposite to each other, recesses are disposed on both the metal side walls, openings of the recesses face an inner side of the metal cavity, and the dielectric substrate is embedded in the two recesses.

7. The base station antenna according to claim 6, wherein the suspended strip line comprises two of the metal strips, and the two metal strips are oppositely located on two sides of the dielectric substrate.

8. The base station antenna according to claim 1, wherein the strip line comprises a dielectric and a conductor strip disposed in the middle of the dielectric, the dielectric is disposed between two conductive planes, and the two conductive planes are both grounded.

9. The base station antenna according to claim 1, wherein the first transmission line is the microstrip, the microstrip comprises a dielectric substrate and a metal strip, and the metal strip is fixedly connected to the dielectric substrate.

10. The base station antenna according to claim 1, wherein the feed network is electrically connected to an antenna connector through the cable.

11. The base station antenna according to claim 1, wherein the second transmission line includes a first segment and a second segment, one end of the first segment is connected to the internal structure, the other end of the first segment is connected to the second segment, the one end of the second segment is connected to the first segment, the other end of the second segment is connected to the first transmission line.

12. The base station antenna according to claim 11, wherein the second transmission line is L-shaped.

13. The base station antenna according to claim 1, wherein the housing includes a top plate that is opposite to an end cover of the cavity and two side plates that are separately located on two sides of the top plate, the two side plates are disposed opposite in which one end is fixedly connected to the top plate and the other end is fixedly connected to the end cover.

14. The base station antenna according to claim 13, wherein the housing is made of a metal material.

15. The base station antenna according to claim 1, wherein an end cover of the cavity is provided with a through hole, wherein the internal structure of the feed network is connected to the second transmission line through the through hole.

16. A base station, comprising a base station antenna and a feeder connected to the base station antenna, wherein the base station antenna comprises: a feed network, a cable, and an adapter structure, wherein the feed network comprises a cavity and an internal structure located in the cavity, the adapter structure comprises a first transmission line and a second transmission line, one end of the first transmission line is electrically connected to one end of the second transmission line, the other end of the first transmission is electrically connected to the cable;

wherein the first transmission line is completely located outside the cavity, one end of the second transmission line is connected to the first transmission line, and the other end of the second transmission line extends into the cavity and is connected to the internal structure, the first transmission line and the second transmission line are configured to transmit a radio frequency signal;

the transmission line structure of the first transmission line is a suspended strip line, a microstrip, or a strip line;

the transmission line structure of the second transmission line is a suspended strip line, a microstrip, or a strip line;

the adapter structure further comprises a housing, the housing covers the first transmission line.

17. The base station according to claim 16, wherein the first transmission line and the second transmission line use a same transmission line structure.

18. The base station according to claim 16, wherein the first transmission line and the second transmission line use different transmission line structures.

19. The base station according to claim 16, wherein the feed network comprises a phase shifter and a power divider, and the power divider is electrically connected to the phase shifter.

20. The base station according to claim 16, wherein the suspended strip line comprises a metal strip.

* * * * *